Aug. 27, 1957   L. W. GUTH ET AL   2,804,582
ELECTRIC INDUCTION MOTOR REVERSING CIRCUIT
Filed July 13, 1956   3 Sheets-Sheet 1

Inventors:
Russell M. Sasnett,
Lauren W. Guth,
by Robert G. Iries
Their Attorney.

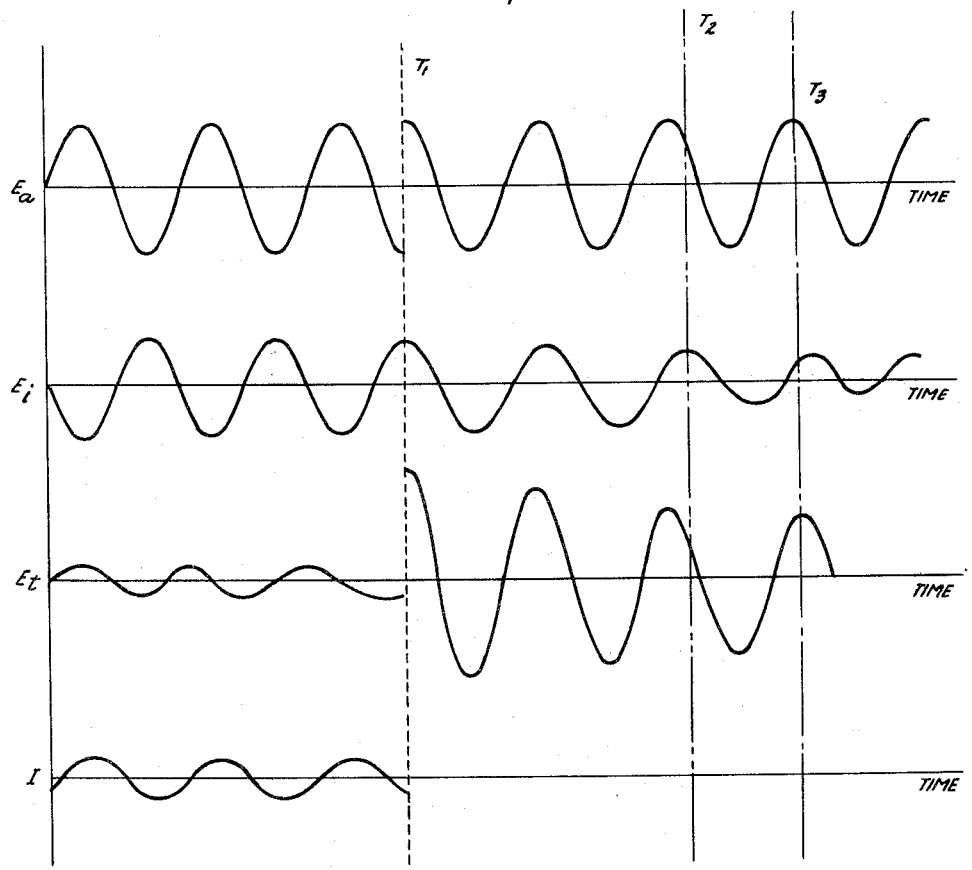

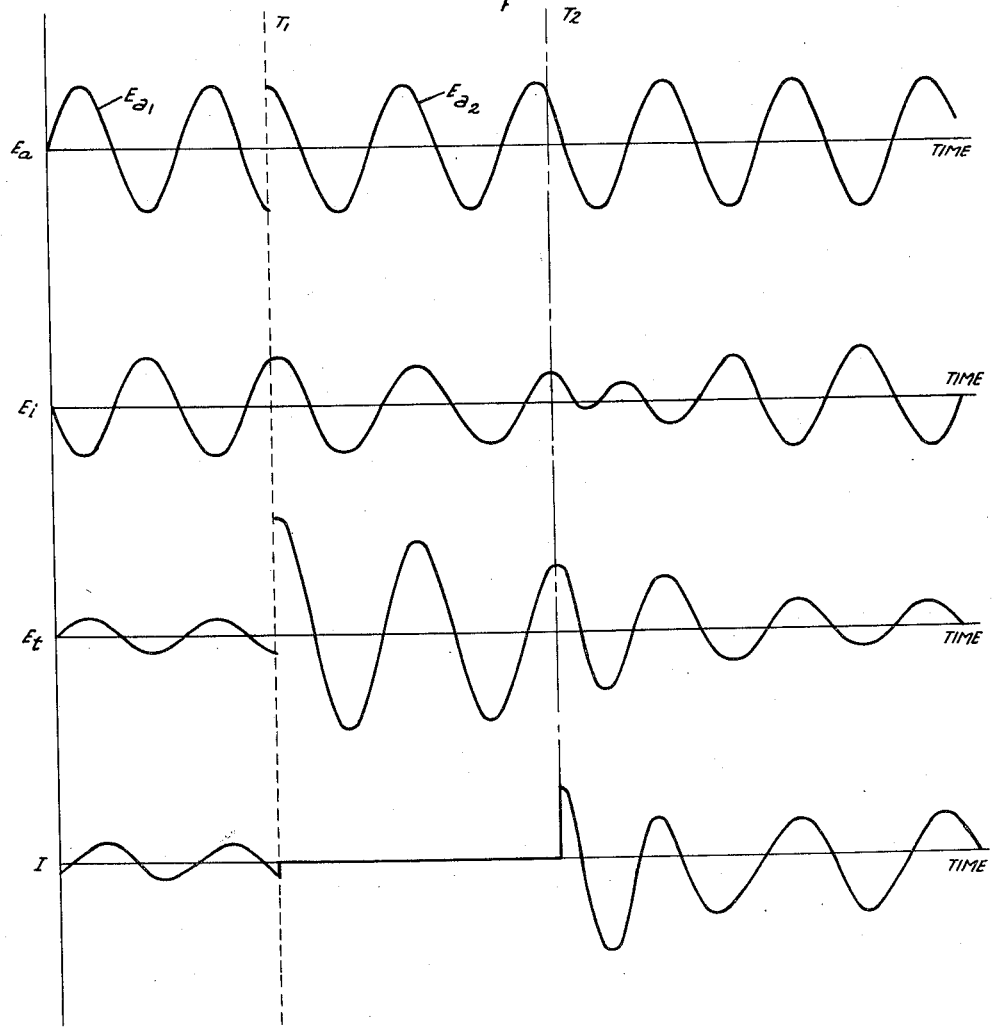

United States Patent Office 2,804,582
Patented Aug. 27, 1957

2,804,582

ELECTRIC INDUCTION MOTOR REVERSING CIRCUIT

Lauren W. Guth and Russell M. Sasnett, Louisville, Ky., assignors to General Electric Company, a corporation of New York Application July 13, 1956, Serial No. 597,665

4 Claims. (Cl. 318—207)

This invention relates to dynamoelectric machinery, and more particularly to rapidly reversible electric motors of the induction type.

In general, the electric motor most frequently used (particularly for home use) is of the induction type, single-phase, with a rotatably mounted squirrel cage rotor and a stator member mounted concentrically therewith. Main and starting windings are positioned on the stator member in suitable relation to provide self-starting action. The design is such that during starting both the windings are energized to provide, in effect, two-phase action; as the motor comes up to speed, the starting winding is cut out of the circuit, and the motor continues to run on the main winding alone. In a common design of this type, the connection of the starting winding across the source of power, as the motor begins operation, is provided by a relay having a coil in series with the main winding and a contact in series with the starting winding; the current through this coil is relatively high when the motor starts, and the coil picks up the contact to effect connection of the starting winding; as running speed is approached, the current through the coil decreases, and at a predetermined value, the relay coil will drop the contact out to its disconnecting position.

An increasing number of applications for such motors require reversing action; these applications are frequently such that the motor reversal must be almost instantaneous to provide satisfactory results. Consequently, a great many circuits have been devised to provide swift reversing of these motors, and, frequently, these circuits have assumed considerable complexity. As a result, rapidly reversing motors have come to be expensive items. It is most desirable to provide a reversing motor of the above type where the reversal will be exceedingly fast, but where the added expense which has previously been required for such an effect is avoided.

It is, therefore, an object of this invention to provide a reversible induction-type single-phase motor with superior reversing features and a highly economical and simple circuit.

Further objects and advantages of this invention will become apparent and the invention will be better understood by reference to the following description and the accompanying drawings, and the features of novelty which characterize this invention will be pointed out with particularity in the claims annexed to and forming a part of this specification.

We have discovered that a transient current greater than the normal running current is always produced in the main winding of a single-phase induction motor upon reversing the connections of the main winding across the power source. This transient current, though variable depending on the time interval between disconnection and reverse reconnection, is always measurably greater than the running current, and may be utilized to initiate rapid and positive reversal of the motor. Thus, in its broader aspect, the invention provides a reversible induction-type alternating-current single-phase motor having a rotatably mounted closed-circuit rotor secondary member, and a stator primary member mounted concentrically therewith. The stator member has main and starting windings positioned thereon and adapted to be connected across a source of alternating current power. Switch means are provided for reversing the connection of the main winding with respect to the starting winding and the power source, and a current relay is provided with its coil in series with the main winding and a contact in series with the starting winding so as to control the energization thereof. The switch means are arranged to reverse the main winding connection. When this is effected, there is produced in the relay coil a transient current which is measurably greater than the running current therethrough. The relay coil is so designed as to close its contact upon passage of the transient current, and to remain closed during a period of time at least equal to the time required for the current in the starting winding to produce rotor currents high enough to produce a total current in the main winding greater than the drop-out current rating of the relay. This completes the starting winding circuit, and the motor will plug down to zero speed and come up to speed in the opposite direction, the relay opening as the motor approaches rated speed in the opposite direction.

Thus, by proper proportioning and connection of the reversing switch, the motor, and the relay, rapid reversal of a single-phase induction-type motor may be obtained without the provision of any additional elements.

In the drawings,

Figure 5 is a graph showing the effect of the time of disconnection before reverse reconnection of the main winding on the induced voltage, the total of the induced voltage and applied voltage and the current; and Figure 6 is a graph showing the applied voltage, the induced voltage, the total of the two, and the current during a particular main winding reversing operation.

Figure 1:
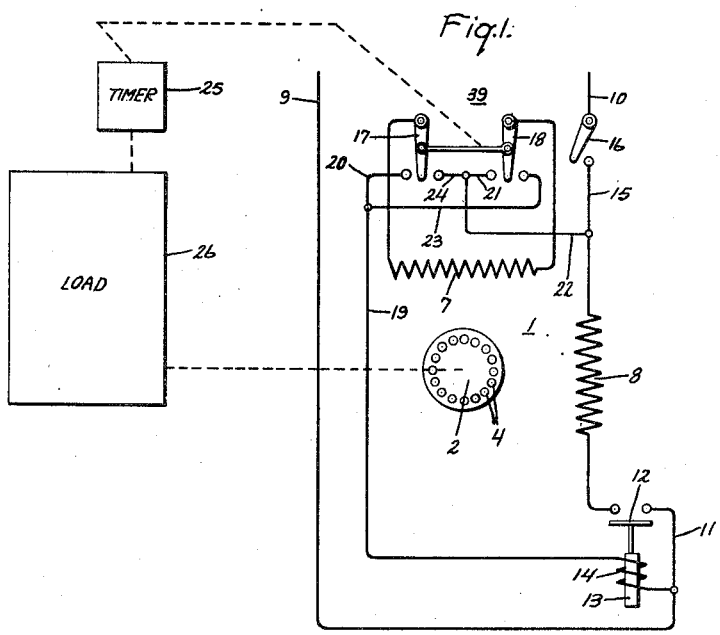
Figure 1 is a schematic diagram of the improved reversing motor of this invention.
Figure 2:
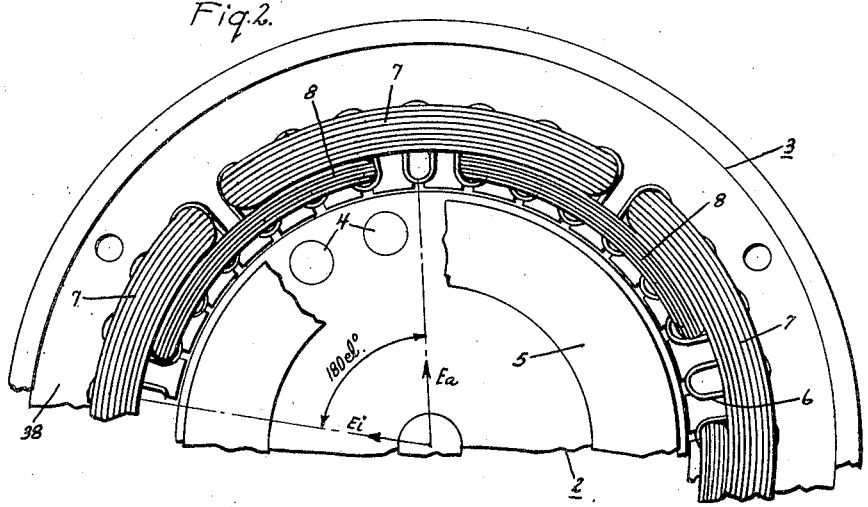
Figure 2 is a fragmentary end view of the motor stator member showing the vectorial relationship of the induced voltage and the applied voltage during normal motor operation.

Referring now to Figures 1 and 2 of the drawings, there is shown a single-phase electric motor 1 of the induction type having a rotor member 2, which is a closed-circuit secondary member well known to those familiar with induction-type motors, and a stator primary member 3 mounted concentrically therewith. Rotor member 2 is generally made up of a stacked plurality of thin laminations of magnetic material with a plurality of conductors 4 extending throughout its length and electrically joined at each end by end rings 5. Stator member 3 has a core 38 also generally formed of a stacked plurality of thin laminations of magnetic material with slots 6 formed therein extending from the bore thereof. A main winding 7 and a starting winding 8 are arranged in the slots in spaced relation with respect to time and distance as is well known in the art.

A pair of lines 9 and 10 are adapted to be connected across a source of alternating current power (not shown). Starting window 8 is arranged to be connected across the source through lines 9 and 11, contact 12 of a relay 13 having an actuating coil 14, line 15, a contact arm 16 provided to control connection of motor 1 across the source of power, and line 10. Main winding 7 has its ends connected across a pair of contact arms 17 and 18 of a two-pole double-throw switch 39. When the contact arms are closed to the left, as viewed in Figure 1, a circuit is completed through line 9, relay coil 14, lines 19 and 20, contact arm 17, main winding 7, contact arm 18, lines 21, 22 and 15, contact arm 16, and line 10. When contact arms 17 and 18 are closed to the right, as viewed in Figure 1, a circuit is completed through line 9, relay coil 14, lines 19 and 23, contact arm 18, main winding 7, contact arm 17, lines 24, 22 and 15, contact arm 16 and line 10. It will thus be seen that for the two different positions of contact arms 17 and 18 of switch 39, the polarities of the currents flowing through the main winding 7 are reversed with respect to the lines 9 and 10 and the starting winding 8. The contact arms may be operated by any desired means, such as a timer 25 which controls the cycle of a load 26, such as an automatic washing machine, operated by motor 1.

When motor 1 starts from standstill, main winding 7 will draw a relatively high current. Relay 13 is designed so that coil 14 will respond to this current to pick up contact 12 so as to move it to its closed position. In this manner, starting winding 8 will be connected across the source of alternating current power in parallel with main winding 7. Motor 1 will then accelerate; as the running speed is approached, the current in main winding 7 drops to a value where relay coil 14 permits contact 12 to drop out thereby de-energizing starting winding 8. This operation is the same regardless of the direction of rotation selected when the motor is started from a standstill, and is well known in the art.

Figure 3:
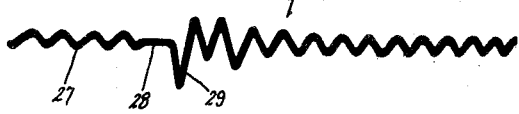
Figure 3 is a diagram of an oscilloscope reading of the transient current through the main winding and relay coil before, during, and after disconnection from and reverse reconnection across the power source, with the starting winding out of the circuit at all times.
Figure 4:
Figure 4 is a diagram of an oscilloscope reading of the transient current through the main winding and relay coil before, during, and after disconnection from and reverse reconnection across the power source with the starting winding reconnected by the relay because of the transient current.

When motor 1 is operating at running speed in either direction, and it is desired to reverse the direction of rotation, contact arms 17 and 18 are moved from one operative position to the other so as to disconnect winding 7 and reconnect it in the opposite direction. The effect of disconnection and subsequent reverse reconnection of winding 7 is best described in connection with Figures 3 and 4 which show what happens to the current through the winding, Figure 3 being illustrative of the condition without any starting winding present and Figure 4 showing what happens with a starting winding. Thus, the ripple at 27 in each of Figures 3 and 4 represents the ordinary alternating current through the winding. Numeral 28 in each case represents the zero current resulting from the opening of the winding circuit. Numeral 29 shows in each of the figures the relatively large transient current which occurs upon reclosing of the winding circuit, and which is understood to result from the fact that the induced electromotive force in the main winding due to residual magnetism has the effect of adding to the line voltage across the winding. In normal running conditions, this induced voltage is often referred to as "back electromotive force"; upon reversing the polarity of the line connections, the relationship is reversed and the induced voltage then becomes a forward electromotive force and therefore adds to the applied voltage to produce the large transient current peak. Since there was no starting winding involved in Figure 3, the transient 29 of that figure represents the pure effect of the reverse reconnection.

Returning for an instant to Figure 1, it will be seen that operation of arms 17 and 18 of switch 39 will produce a transient current such as that described above, and that this current will pass through relay coil 14. The switching time, as represented in Figures 3 and 4 by the horizontal length of line 28, is selected so that the minimum transient current 29 will be sufficient to pick up relay 13, thus closing contacts 12. Relay 13 is further designed so that it will remain closed long enough for the starting winding current to induce rotor currents great enough to cause the main winding currents to increase above the drop-out current rating of the relay. This condition is shown at 30 in Figure 4 which is an oscillograph of the main winding current in a regular motor having a starting winding which has been closed by relay 13. Motor 1 will, consequently, plug down to zero speed and then accelerate in the opposite direction. As it approaches rated speed, the current will decrease, as shown at 31, past the relay drop-out current, the starting winding will be disconnected, and the motor will continue to run in the opposite direction.

Referring now to Figure 5, the actual electrical values for main winding 7 before and after opening the main winding circuit, but before reclosing that circuit in the reverse direction, will be described. In the first line of Figure 5 there is shown the applied line voltage $E_a$. It will further be observed that, in opposition to the usual manner of a reference voltage, the applied voltage originally is shown as $E_{a1}$, but then, from time $T_1$ illustrated by the vertical dotted line, is shown by $E_{a2}$ and is exactly 180° out of phase with $E_{a1}$.

The next curve of Figure 5 shows the induced voltage $E_i$; it will be observed that, during running of the motor as shown in the part of the time curve prior to $T_1$, $E_i$ is directly opposite to $E_{a1}$ so as to subtract therefrom. When the main winding is disconnected from the source, $E_i$ becomes proportional to the residual magnetic field produced by the decaying rotor currents and to the speed. Since, upon opening of the circuit across winding 7, the rotor 2 of the motor will slow down and the rotor currents will decay, $E_i$ will decrease in magnitude as the open time of the switch progresses from instant $T_1$, and its instantaneous values will shift further and further out of phase with $E_{a2}$. Reference to that part of the $E_i$ curve to the right of the $T_1$ line, i. e., subsequent thereto, will show that the value of $E_i$ is decreasing, and a comparison of the $E_i$ and $E_{a2}$ values at any given instant will show that $E_i$ lags further out of phase with $E_{a2}$ as the amount of time from instant $T_1$ increases.

Referring now to the $E_t$ curve of Figure 5, $E_t$ represents the total voltage at any given instant in the main winding, that is, the vectorial addition of $E_a$ and $E_i$. Since during normal operation, $E_a$ and $E_i$ are 180 degrees opposed to each other, $E_t$ will actually be the difference of the total instantaneous value of the two. This is shown by the portion of the $E_t$ curve to the left of line $T_1$. However, at any instant after $T_1$, the polarity of the applied voltage, 180° reversed to its previous condition, is shown by $E_{a2}$. Consequently, starting from instant $T_1$, $E_{a2}$ and $E_i$ are substantially in phase with each other and add to each other to create a large $E_t$. As the open switch time before reverse reconnection continues, moving to the right from line $T_1$, $E_t$ decreases because of the decrease in the value of $E_i$ and because of the fact that $E_i$ is lagging further out of phase with $E_{a2}$.

The current I, represented by the last graph of Figure 5, is in a steady state prior to opening of the circuit to winding 7 until instant $T_1$ and, subsequent to that instant, is of course zero because of the open circuit condition until reverse reconnection.

Referring now to Figure 6, the electrical values within winding 7 for a particular switching operation will be described. The top line of Figure 6 represents the applied voltage curve which is, of course, the same as that described in Figure 5 with $E_{a2}$ starting from instant $T_1$ and being 180° out of phase with $E_{a1}$. The instant of reclosing the switch arms so that there is an electrical circuit completed across winding 7 in the reversed direction, is shown by vertical line $T_2$ which is arbitrarily selected in Figure 5 with the result of closing being shown in Figure 6. The induced voltage $E_i$ is, as before, 180° out of phase with the applied voltage $E_{a1}$ prior to instant $T_1$. Immediately after instant $T_1$, $E_i$ is in phase with the subsequent applied voltage $E_{a2}$ and, during the time that the switch is open, as represented by the horizontal distance between $T_1$ and $T_2$, will become smaller and will have an instantaneous value lagging more and more behind $E_{a2}$. Upon reverse reconnection of the main winding at instant $T_2$, the inherent nature of $E_i$ will cause it to quickly fall 180° out of phase with $E_{a2}$ as shown by the portion of the $E_i$ curve to the right of $T_2$ in Figure 6.

Moving now to the $E_t$ curve, Figure 6 shows the same phenomenon as Figure 5 for the period of time before $T_1$ and for the period of time from $T_1$ to $T_2$. Subsequent to $T_2$, with the electrical circuit re-established in a reverse direction across the main winding, $E_t$ will quickly decrease from its high value at instant $T_2$ to the value it had before $T_1$ because of the re-establishment of $E_i$ 180° out of phase with $E_{a2}$.

Referring now to the current curve at the bottom of Figure 6, it shows the normal slightly lagging current sine wave during operation before instant $T_1$, with applied voltage $E_{a1}$ and induced voltage $E_i$. Between $T_1$ and $T_2$ the circuit is open and the current therefore is zero as shown. However, the instant the circuit is completed at point $T_2$, the current then becomes a function of $E_t$ again. However, as explained before, $E_t$ is much larger than ordinarily at the instant $T_2$ when the main winding circuit is reversedly reconnected; for this reason, the current will have a transient value much larger than that of ordinary operation, as can be seen by the current wave directly to the right of line $T_2$. It will further be seen, still moving to the right on the I curve from line $T_2$, that the current remains at a value higher than the ordinary operating current as explained in connection with Figure 4.

As explained above, the transient current which occurs when the contact arms are reclosed in the opposite direction is always larger than the normal running current and is dependent to a considerable extent upon the magnitude of voltage vector $E_t$. As $E_t$ becomes greater than $E_a$ the transient current shows a noticeable increase. This is particularly true where, as is common, motor 1 is run with its magnetic material close to saturation at $E_a$, and therefore in the saturation range for a larger $E_t$. As has also been explained, $E_i$ starts to lag behind $E_{a2}$ from instant $T_1$; if the critical angle of lag is called $\theta$, then the angle $\theta$ beyond which the addition of $E_{a2}$ and $E_i$ results in a sum less than $E_{a2}$ may be found by use of the following expression:

$$\cos\theta = -\frac{E_i}{2E_{a2}}$$

The peak value of $E_i$ at any given instant is always somewhat smaller than that of $E_a$; generally it is considerably smaller at the limiting point so that, in effect, $\theta$ is generally close to but greater than 90°. The design of relay 13 is made considerably more economical when the reclosing of contact arms 17 and 18 in the opposite direction is effected before $E_i$ has slipped to the critical angle $\theta$ behind $E_a$ since there is a very substantial transient current surge obtained and the pick-up and drop-out current ratings of the relay may depart substantially from the running current of the motor. Referring again to Figure 5, a comparison of the $E_a$ curve and the $E_t$ curve shows that the two are substantially equal at instant $T_3$.

It will be observed from the foregoing description that, for the optimum efficiency and economy to result from use of the invention, the disconnection and reconnection of the main winding in the opposite direction should occur in an amount of time less than that taken for the induced voltage $E_i$ to slip behind the applied voltage $E_a$ to a point where the vectorial sum of the two is less than $E_a$. However, as set forth above, the invention, in its broader aspect, contemplates use of the phenomenon that the transient current is measurably larger than the running current; and the phenomenon is not restricted to the optimum range described.

Relays and switches of the type described in this specification may be designed by standard methods so as to respond to varying degrees of transient current magnitude; many such relays and switches are commercially available. Thus, the design of neither the switch nor the relay is to be taken as a limiting factor in this invention except to the extent set forth. While the invention is not to be considered so limited, a more thorough understanding of it may be obtained by reference to the specific example set forth herebelow. The circuit of the invention was used with a relay having the following characteristics:

Pick up current _____ 16 amperes.
Pick up time _____ .8 cycle.
Drop out current _____ 14.5 amperes.
Closed time _____ 2 cycles when initiated by a 27 amp. ½ cycle pulse.

A two-pole double-throw switch having a reversing time of approximately 28 to 31 milliseconds was utilized. The motor used had the following characteristics:

Rated voltage _____ 115 volts.
Starting current _____ Main: 18 amperes.
                                     Start: 22 amperes.
Full load current _____ 6.2 amperes.
Horsepower rating _____ ⅓.
Number of poles _____ 4.
Locked rotor impedance (measured at current of 8 amperes in main winding) _____ 6.1 ohms.
Resistive component _____ 4.2 ohms.
Inductive component _____ 4.4 ohms.

With elements having the above characteristics assembled in the relationship set forth in Figure 1 of the drawings, a minimum transient current of 22.8 amperes was obtained. The complete reversal of the motor, after the reclosing of the switch, was effected in ten cycles of 60 cycle power, i. e., one-sixth of a second. After the reclosing of the contact arms, the motor continued for less than a full rotation before reversing its direction.

It will be seen from the foregoing that this invention provides a reversing arrangement for a single-phase induction-type motor having a starting winding disconnected by a relay as the motor comes up to speed. It will further be observed that the relationship among the various components forming the improved circuit of the invention may be varied, the essential feature being the use of the transient current to operate the relay upon reversal of the main winding connections. Thus, while the invention has been explained by describing a particular embodiment thereof, it will be apparent that improvements and modifications may be made without departing from the scope of the invention as defined in the appended claims.

What we claim as new and desire to secure by Letters Patent of the United States is:

1. A reversible induction-type alternating-current motor comprising a rotatably mounted closed-circuit rotor secondary member, a stator primary member mounted concentrically therewith, main and starting windings positioned on said stator member and adapted to be connected across a source of alternating current power, switch means connected to said main winding, a current relay having a coil in series with said main winding and a contact in series with said starting winding so as to control energization thereof, said contact being arranged to close upon a predetermined degree of energization of said coil, said switch means being arranged to reverse said main winding connection thereby to produce in said relay coil upon reversed reconnection of said main winding a transient current measurably larger than the running current therethrough, said relay coil being arranged to close said contact upon passage of said transient current therethrough and to keep it closed until the starting winding current induces rotor currents sufficient to cause the main winding current to increase above the drop-out current rating of said relay.

2. A reversible induction-type alternating-current motor comprising a rotatably mounted closed-circuit rotor secondary member, a stator primary member mounted concentrically therewith, main and starting windings positioned on said stator member and adapted to be connected across a source of alternating current power, switch means connected to said main winding, a current relay having a coil in series with said main winding and a contact in series with said starting winding so as to control energization thereof, said contact being arranged to close upon a predetermined degree of energization of said coil, said switch means being arranged to reverse said main winding connection in an amount of time less than that taken for the induced voltage to slip behind the applied voltage to a point where the vectorial sum of the two is less than the applied voltage thereby to produce in said relay coil upon reversed reconnection of said main winding a transient current substantially larger than the running current therethrough, said relay coil being arranged to close said contact upon passage of said transient current therethrough and to keep it closed until the starting winding current induces rotor currents sufficient to cause the main winding current to increase above the drop-out current rating of said relay.

3. A reversible induction-type alternating-current motor comprising a rotatably mounted closed-circuit rotor secondary member, a stator primary member mounted concentrically thereabout and having slots formed at the bore thereof, main and starting windings positioned in spaced relation in said stator member slots and adapted to be connected across a source of alternating current power, switch means connected to said main winding, a current relay having a coil in series with said main winding and a contact in series with said starting winding so as to control energization thereof, said contact being arranged to close upon a predetermined degree of energization of said coil, said switch means being arranged to reverse said main winding connection in an amount of time less than that taken for the induced voltage to slip behind the applied voltage to a point where the vectorial sum of the two is less than the applied voltage thereby to produce in said relay coil upon reversed reconnection of said main winding a transient current substantially larger than the running current therethrough, said relay coil being arranged to close said contact on passage of said transient current therethrough and to keep it closed until the starting winding current induces rotor currents sufficient to cause the main winding current to increase above the drop-out current rating of said relay.

4. A reversible induction-type alternating-current motor comprising a rotatably mounted closed-circuit rotor secondary member, a stator primary member mounted concentrically thereabout and having slots formed at the bore thereof, main and starting windings positioned in said stator member slots in spaced relation and adapted to be connected across a source of alternating current power, switch means including a pair of contact arms connected respectively to the ends of said main winding and respectively movable to two operative positions, said contact arms being arranged to connect said main winding in a first relationship across the source of power when said contact arms are in a first operative position and being arranged to connect said main winding in the opposite relationship across the source of power when said contact arms are in a second operative position, a current relay having a coil in series with said main winding and a contact in series with said starting winding so as to control energization thereof, said contact being arranged to close upon predetermined degree of energization of said coil, movable from each operative position to the other in an amount of time less than that taken for the induced voltage to slip behind the applied voltage to a point where the vectorial sum of the two is less than the applied voltage thereby to produce in said relay coil upon reversed reconnection of said main winding a transient current substantially larger than the running current therethrough, said relay coil being arranged to close said contact upon passage of said transient current therethrough and to keep it closed until the starting winding current induces rotor currents sufficient to cause the main winding current to increase above the drop-out current rating of said relay.

References Cited in the file of this patent

UNITED STATES PATENTS

| 2,320,176 | Dunham et al. | May 25, 1926 |
| 2,388,382 | Brongersma | Nov. 6, 1945 |
| 2,428,784 | Cole | Oct. 14, 1947 |
| 2,488,441 | Shaw | Nov. 15, 1949 |